United States Patent
Franchet et al.

(10) Patent No.: US 6,672,049 B2
(45) Date of Patent: Jan. 6, 2004

(54) EMERGENCY DEVICE FOR RELIGHTING A WINDMILLING TURBOJET

(75) Inventors: Michel Franchet, Pouilly le Fort (FR); Guy Hebraud, Pibrac (FR)

(73) Assignee: SNECMA Moteurs, Paris (FR)

( * ) Notice: Subject to any disclaimer, the term of this patent is extended or adjusted under 35 U.S.C. 154(b) by 39 days.

(21) Appl. No.: 10/173,152

(22) Filed: Jun. 18, 2002

(65) Prior Publication Data

US 2002/0189231 A1 Dec. 19, 2002

(30) Foreign Application Priority Data

Jun. 19, 2001 (FR) .................................... 01 08059

(51) Int. Cl.$^7$ ............................................. F02C 7/262
(52) U.S. Cl. ................... 60/226.1; 60/792; 60/39.162; 60/39.163
(58) Field of Search ................. 60/226.1, 39.162, 60/39.163, 792; 74/DIG. 5

(56) References Cited

U.S. PATENT DOCUMENTS

| | | |
|---|---|---|
| 4,062,185 A | 12/1977 | Snow |
| 4,062,186 A | 12/1977 | Snow et al. |
| 4,651,521 A * | 3/1987 | Ossi .............................. 60/791 |
| 4,776,163 A * | 10/1988 | Brockmann ................... 60/792 |
| 4,799,354 A * | 1/1989 | Midgley ..................... 60/226.1 |
| 5,103,631 A | 4/1992 | Edwards et al. |
| 5,334,061 A * | 8/1994 | Behm et al. .............. 60/39.162 |
| 5,349,814 A | 9/1994 | Ciokajlo et al. |
| 5,694,765 A | 12/1997 | Hield et al. |
| 5,845,483 A | 12/1998 | Petrowicz |

FOREIGN PATENT DOCUMENTS

| | | |
|---|---|---|
| EP | 0 789 454 | 10/1997 |
| GB | 971 690 | 9/1964 |

* cited by examiner

Primary Examiner—Michael Koczo
(74) Attorney, Agent, or Firm—Oblon, Spivak, McClelland, Maier & Neustadt, P.C.

(57) ABSTRACT

An emergency device for relighting a windmilling turbojet, the jet comprising a fan driven by a low-pressure turbine via a first shaft and a compressor driven by a high-pressure turbine via a second shaft disposed coaxially around the first shaft, a differential interconnecting said first and second shafts while compensating for their different speeds of rotation in normal operation or the turbojet, and a braking system connected to the differential so as to enable it to be slowed down or blocked when the turbojet shuts down, thereby enabling the first shaft to entrain the second shaft so that it reaches a speed that favors relighting of the turbojet.

9 Claims, 5 Drawing Sheets

EMERGENCY DEVICE FOR RELIGHTING A WINDMILLING TURBOJET

BACKGROUND OF THE INVENTION

The present invention relates to an emergency device for relighting an airplane turbojet that is windmilling, and more particularly when the jet has suffered an in-flight shutdown.

In the past, long-distance airliners have generally been fitted with four engines. Those airplanes have subsequently been replaced by airplanes propelled by only three engines. This trend towards reducing the number of engines on that type of airplane, together with the trend towards increasing the capacity of airplanes so as to reduce operating costs, has led to large capacity twinjet airplanes known as "large twins" being designed.

The engines fitted to that type of airplane have been developed so as to provide very high thrust with large bypass ratios. The increase in the compression ratio and the inertia of the high-pressure compressor in such an engine has also led to the speed at which the compressor rotates when windmilling decreasing for given flight conditions, and this has had the consequence of increasing the difficulty of relighting the combustion chamber in the event of a shutdown.

Furthermore, the use of twin jets for long flights over oceans increases the seriousness of the consequences in the event of an engine shutting down in flight. Furthermore, for various reasons, a twin jet can also be the subject of multiple shutdowns, something which happens extremely rarely, but is still possible. In the event of an in-flight shutdown, whether voluntary or involuntary, the engine can conserve the ability to restart. In the event of a single shutdown on a multi-jet airplane, the engine can be relighted by using the starter, relying on power delivered by the other engine(s) or by the auxiliary power unit. However, in the event of multiple extinctions for a common mode cause, the starter has no external power if the auxiliary power unit has stopped or been shut down, so it cannot be used, and the engine must be relighted while it is windmilling. The auxiliary power unit is a device that is conventionally used for powering the turbojet starter with electricity or compressed air.

The power available from the batteries of twin jets is limited, so emergency electrical systems cannot restart the engine. The power generated by the emergency air turbine is low (about 5 kilowatts (kW)) and the mass penalty associated with such a turbine is very large (about 100 kilograms (kg)), and it requires regular inspections.

The widespread use of long duration twin-engined flights over oceans, associated with the foreseeable development of engines towards ever-increasing bypass and compression ratios has thus had the consequence of increasing interest in devices that make it easier to relight engines in flight while they are windmilling.

For a turbojet having a large bypass ratio, when a shutdown occurs in flight, the turbines are no longer fed with heat energy, and the speed of rotation of the compressor and fan rotors decreases considerably in corresponding manner. Nevertheless, the relative wind (air flow) passing through the fan stage suffices to keep it rotating, which phenomenon is generally referred to by the term "windmilling". The high-pressure compressor receives only a small fraction of this relative wind, and therefore does not always rotate at a speed that is fast enough to allow the engine to be relighted without external assistance. The high-pressure compressor, when rotated by relative wind, needs to rotate quite quickly (N2 speed close to 20%) in order to deliver pressure greater than the minimum pressure for ignition, prior to admitting fuel and igniting it.

The fan is an advantageous source of energy, comprising both kinetic energy due to its own inertia and also wind energy extracted from the flow of air passing through it. Transferring a fraction of this energy to the high-pressure body then suffices to bring the high-pressure compressor up to a speed that allows the engine to be relighted. Thus, at all airplane speeds, power is available that can be transmitted from the low-pressure rotor (fan) to the high-pressure rotor (compressor).

It should be observed that the inertia and the energy from windmill operation of the low-pressure stage as a whole (fan and low-pressure turbine) are always much greater than those of the high-pressure stage (compressor and high-pressure turbine), and that future increases in bypass ratios will further increase this ratio.

Thus, U.S. Pat. No. 5,845,483 and French patent Nos. 2 315 259 and 2 351 266 disclose hydraulic, electrical, or pneumatic power generators driven by the fan for the purpose of transmitting the energy accumulated by the fan to the high-pressure compressor via a suitable device. Nevertheless, each of those relighting systems presents the major drawback of constituting an assembly that is complicated and bulky.

U.S. Pat. No. 5,349,814 discloses a gear train fitted with ratchet clutches or cam clutches connecting the shaft of the lower-pressure turbine to the shaft of the high-pressure turbine to transmit torque from the fan at predetermined engagement and disengagement speeds. However, that relighting device is not very reliable. It is very difficult to calibrate, so there is always a risk of it not disengaging at the right moment.

OBJECT AND SUMMARY OF THE INVENTION

The present invention thus seeks to mitigate such drawbacks by proposing an emergency device for relighting a windmilling turbojet, which device is continuously operational and simple, fast, and reliable to use.

To this end, the invention provides an emergency device for relighting a windmilling turbojet, the jet comprising a fan driven by a low-pressure turbine via a first shaft and a compressor driven by a high-pressure turbine via a second shaft disposed coaxially around the first shaft, said device comprising a differential interconnecting said first and second shafts while compensating for their different speeds of rotation in normal operation or the turbojet, and a braking system connected to the differential so as to enable it to be slowed down or blocked when the turbojet shuts down, thereby enabling the first shaft to entrain the second shaft so that it reaches a speed that favors relighting of the turbojet.

Thus, the emergency relighting device takes energy from the windmilling fan and transfers it to the high-pressure shaft in order to bring it up to a speed that enables the turbojet to be relighted. The differential comprises a planet-carrying annular gear which turns around the two shafts and which is coupled in rotation to a rotary portion of the braking system. This can be constituted by a brake, e.g. a disk brake or a retarder, and it can be controlled by a device under hydraulic, pneumatic, electrical, electromagnetic, or combined control. It is advantageously controlled by an electronic computer enabling the transfer of energy from the low-pressure shaft to the high-pressure shaft to be adapted as a function of the speed of rotation of the high-pressure shaft.

BRIEF DESCRIPTION OF THE DRAWINGS

Other characteristics and advantages of the present invention appear from the description given below, with reference to the accompanying drawings which show an embodiment that has no limiting character. In the figures.

DETAILED DESCRIPTION OF EMBODIMENTS

Figure 1:
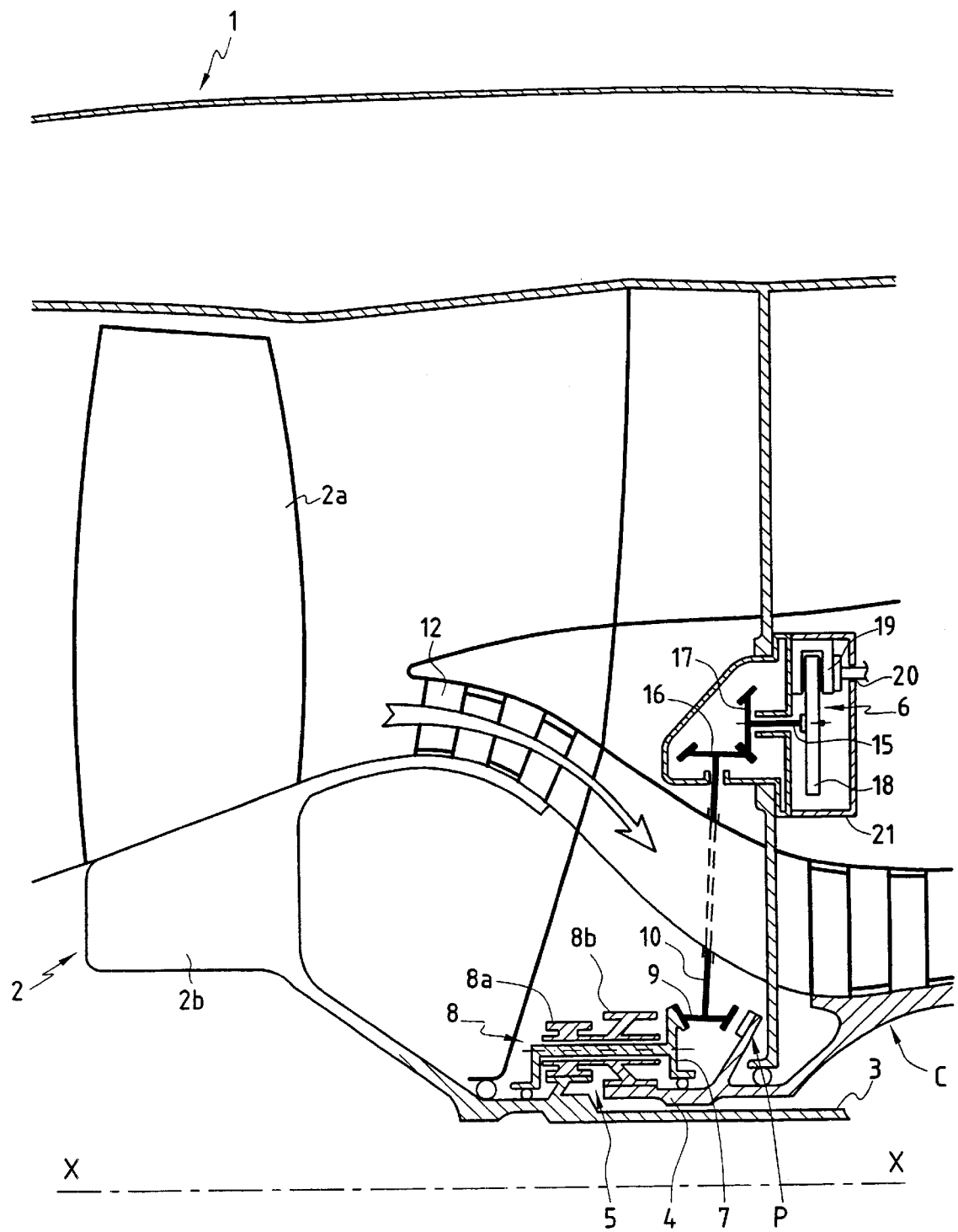
FIG. 1 is a fragmentary diagrammatic view of a turbojet including a first embodiment of a relighting device of the invention.

Reference is made initially to FIG. 1, which shows a portion of a turbojet 1, e.g. fitted to a twin-jet type long distance airliner.

In conventional manner, the turbojet 1 of longitudinal axis X—X comprises a fan 2 having a plurality of blades 2a regularly distributed around a disk 2b, and a low-pressure turbine (not shown) which rotates the fan via a first shaft 3 rotating on the axis X—X and coupled to the disk 2b. A high-pressure compressor C is rotated by a high-pressure turbine (not shown) via a second shaft 4 disposed coaxially around the first shaft 3 and having the same axis of rotation coinciding with the longitudinal axis X—X of the turbojet 1.

Below, the high-pressure body of the turbojet is defined as being the assembly comprising the high-pressure compressor, the high-pressure turbine, and the second or high-pressure shaft 4. Similarly, the low-pressure body of the turbojet combines the low-pressure turbine and the first or low-pressure shaft 3.

Typically, in flight, the turbojet 1 receives atmospheric air through the fan, and a large fraction of this air contributes to the thrust for propelling the airplane in flight. The remaining fraction of this air is conveyed to the high-pressure compressor via a primary channel 12. The compressed air leaving it is then directed to a combustion chamber (not shown) in which it is mixed with a fuel and then ignited in order to produce combustion gas which drives the high- and low-pressure turbines prior to being ejected. In order to start the turbojet on the ground or to restart it in flight, it is conventional to provide a starter. The starter receives compressed air or electricity coming from an auxiliary power unit (not shown) or from another engine that is in operation and it enables the high-pressure shaft 4 to be rotated via conventional transmission means (e.g. a gearwheel P) and taken up to a speed that enables the turbojet to be started.

In order to assist or replace the starter in flight, the turbojet includes an emergency relighting device. In a first embodiment, this device comprises a differential 5 and a braking system 6. The differential 5 serves to interconnect the low- and high-pressure shafts 3 and 4 and serves to compensate for the speed differences between the high-pressure body and the low-pressure body during normal operation of the turbojet.

It is known that the low- and high-pressure bodies rotate at different speeds. For example, for a conventional turbojet having a large bypass ratio, the high-pressure body has an N2 speed of rotation of about 10,000 revolutions per minute (rpm) to 12,000 rpm, and the low-pressure body runs at an N1 speed of about 2,000 rpm to 3,000 rpm. With these values, the ratio between these speeds lies in the range about 3 to 6.

Figure 2:
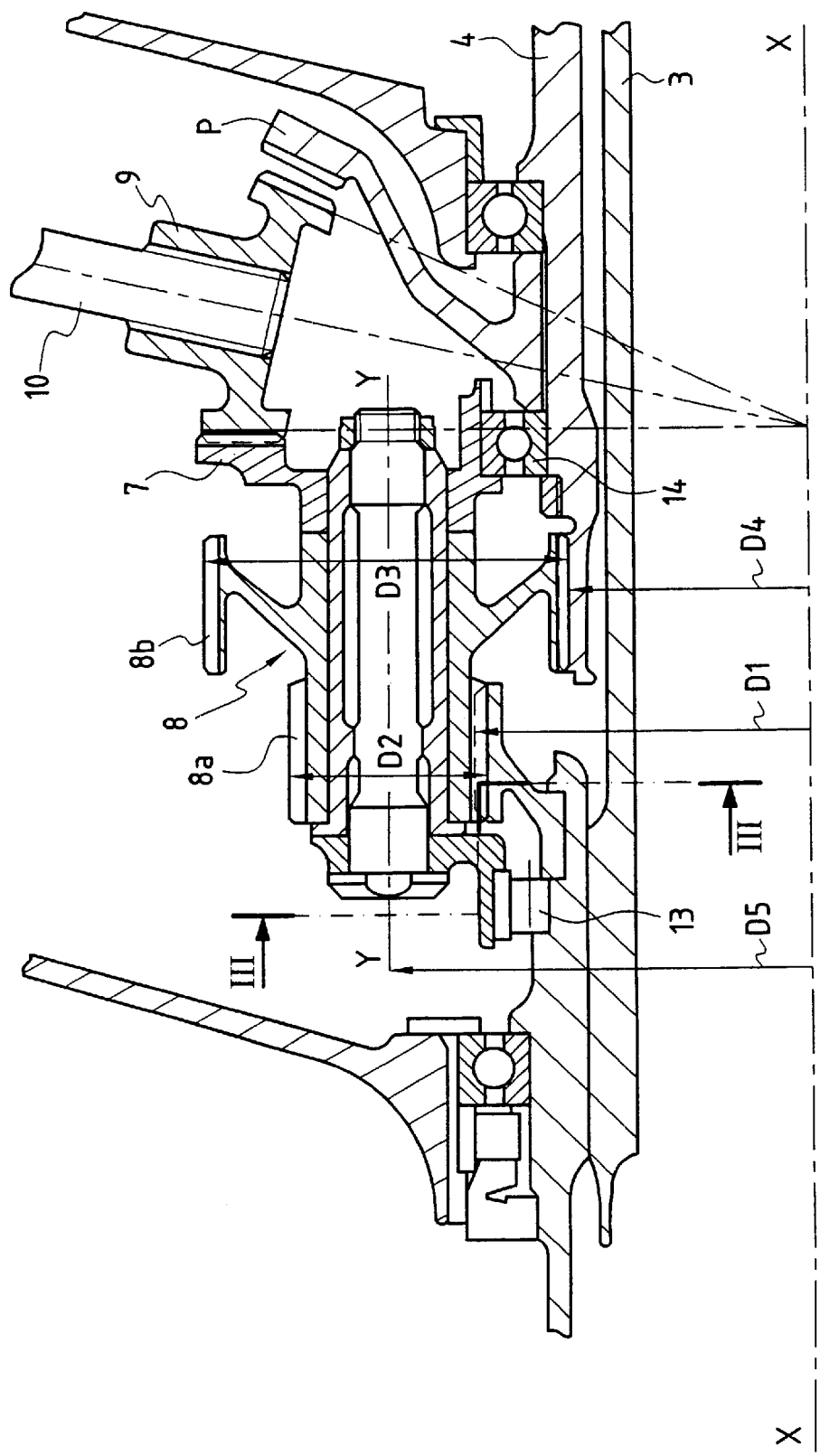
FIG. 2 is a diagrammatic view of the FIG. 1 differential in a co-rotating shaft configuration.
Figure 3:
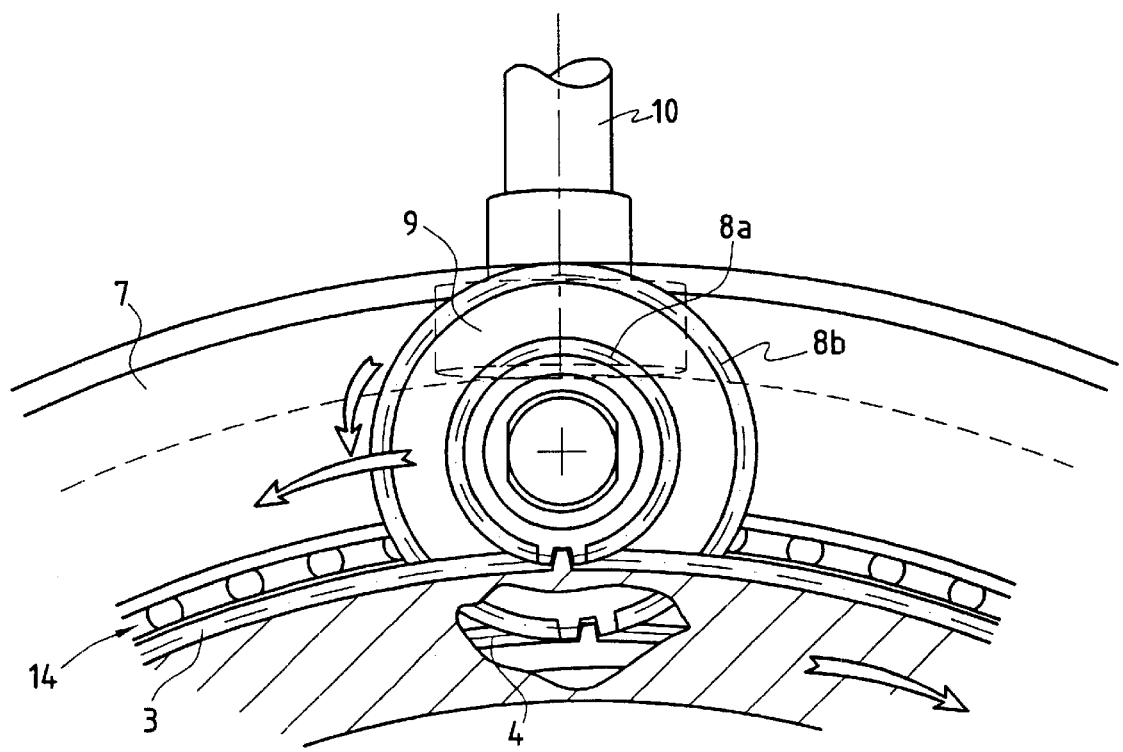
FIG. 3 is a section view on III—III of FIG. 2.

In order to compensate for these speed differences, the differential 5 in this first embodiment essentially comprises (cf. FIGS. 2 and 3):

at least one planet-carrying annular gear 7 which turns freely in normal operation of the turbojet on a bearing 13 (e.g. a roller bearing) placed on the low-pressure shaft 3, and on a bearing 14 (e.g. a ball-bearing) mounted on the high-pressure shaft 4; and at least one planet gear 8 having two rows of teeth 8a and 8b of different diameters and on the same axis of rotation Y—Y parallel to the axis X—X, which planet gear is fixed to the planet-carrying gear 7. The rows of teeth 8a and 8b mesh respectively with the low-pressure shaft 3 and with the high-pressure shaft 4.

In normal operation of the turbojet, the rows of teeth 8a and 8b of the planet gear 8 orbit, and the planet-carrying annular gear 7 turns freely around the shafts 3 and 4.

Because of the speed difference between the high- and low-pressure bodies, the planet gear 8, which turns freely about its own axis of rotation Y—Y, drives the planet-carrying annular gear 7 by means of the pin on which it is mounted. The annular gear 7, which carries the planet gear 8, is thus driven to rotate freely about the axis of rotation X—X as a function of the difference between the speeds of rotation of the low-pressure shaft 3 and the high-pressure shaft 4. The rows of teeth 8a and 8b of the planet gear 8 orbit around the axis of rotation Y—Y, thereby compensating for the difference in speeds of rotation between the low-pressure shaft 3 and the high-pressure shaft 4.

Because of the presence of the bearings 13 and 14 on which the planet-carrying annular gear 7 is mounted, this assembly turns freely, i.e. consuming only a very small amount of kinetic energy coming from the rotation of the shafts 3 and 4.

Still in this first embodiment, the planet-carrying annular gear 7 drives a rotary shaft 15 of the braking system 6 via a transmission system comprising a bevel gear 9 meshing with the planet-carrying annular gear 7, a transmission shaft 10 coupled to the gear 9, and a pair of gears 16, 17 forming an angled transmission coupled to the shaft 15.

This transmission of motion between the planet-carrying annular gear 7 and the braking system 6 also consumes very little energy.

In the example shown, the braking system 6 comprises a brake disk 18 constrained to rotate with the shaft 15. In well-known manner, the disk 18 can be braked by means of brake pads carried by a caliper 19 and pressed against the faces of the disk 18 by hydraulic fluid under pressure delivered by a pipe 20. The braking system is received in a housing 21.

Other types of conventional braking system could be used, such as brakes comprising one or more rotor disks interposed between stator disks and capable of being pressed axially against one another, or indeed retarders.

The braking system can also be controlled, by way of example, by means of devices actuated by means that are electrical, electro-hydraulic, pneumatic, magnetic, magnetostrictive, or a combination of these various means. It should be observed that a disk brake appears to be well adapted because of its light weight, its reliability, and its compactness.

There follows a description of the operation of the above-described emergency relighting device.

As explained above, the planetary gear train made up of the elements of the differential 5 and the elements providing mechanical connection with the disk of the braking system 6 turns freely and compensates for the speed differences between the low-pressure body and the high-pressure body in normal operation of the turbojet. The planet-carrying gear 7 and the rows of teeth 8a, 8b of the planet gear 8 thus orbit around the first and second shafts 3 and 4, while the bevel gear 9, the shaft 10, the gears 16, 17, and the shaft 15 together with the disk 18 also turn freely.

In the event of the turbojet accidentally shutting down, the speed of the high-pressure body drops considerably (due to its high compression ratio), while the low-pressure body, driven by the fan, turns by a windmill effect. The braking system 6 is then put into operation so as to slow down the planet-carrying annular gear 7 via the transmission shaft 10 engaged with the bevel gear 9.

Slowing down the planet-carrying gear 7 causes the high-pressure shaft 4 to be coupled mechanically with the low-pressure shaft 3 via the planet gear 8. By exerting a mechanical stress (braking) on the planet-carrying gear 7, the orbital rotation of the planet gear 8 is slowed down and no longer takes place freely as it does during normal operation of the turbojet. The low-pressure shaft 3 then progressively drives the high-pressure shaft 4 until it reaches the N2 speed enabling the turbojet to be relighted.

It is found that the kinetic energy delivered by the fan to the high-pressure body is at a maximum when the disk 18 of the braking system 6 is in a completely blocked position, thus preventing the planet-carrying annular gear 7 from moving. The low-pressure shaft 3 then drives the high-pressure shaft 4 directly via the two rows of teeth 8a and 8b on the planet gear 8. Given that only a fraction of this available energy is needed, slowing down can lead to the turbojet relighting well before the brake disk becomes completely blocked.

In addition, by labeling various diameters as follows (cf. FIG. 2):

D1: the diameter of the gear on the low-pressure shaft 3;

D2: the diameter of the row of teeth 8a on the planet gear 8 which meshes with the low-pressure shaft 3;

D3: the diameter of the row of teeth 8b of the planet gear 8 which meshes with the high-pressure shaft 4;

D4: the diameter of the gear of the high-pressure shaft 4; and

D5: the distance between the longitudinal axis X—X of the turbojet 1 and the axis of rotation Y—Y of the planet gear 8;

the multiplication ratios of the planet gears (D1/D2 and D3/D4) is calculated so that the low-pressure shaft 3 drives the high-pressure shaft 4 with a suitable ratio as a function of engine speeds. As mentioned above, this ratio can lie in the range 3 to 6, for example, the differential acting as a multiplier from the low-pressure shaft 3 to the high-pressure shaft 4.

Furthermore, this multiplication ratio can be modified by increasing or decreasing the distance D5, i.e. by moving the axis of rotation Y—Y of the planet gear 8 away from or towards the axis X—X of the turbojet 1.

When the high-pressure shaft 4 reaches a speed that is fast enough, fuel mixed with compressed air is again introduced into the combustion chamber, and it is then ignited so as to produce the combustion gases necessary for feeding the high and low-pressure turbines.

Once the turbojet has been relighted in this way, the braking system 6 is deactivated so as to allow the planet gear 8 to orbit and so as to allow the planet-carrying annular gear 7 to rotate freely again in order to compensate for the speed difference between the high-pressure body and the low-pressure body.

By way of indication, the N2 speed that enables the turbojet to be relighted must, for example, correspond to a speed of not less than about 20% of the maximum speed of rotation of the high-pressure shaft 4, and the stabilized N2 speed at the end of starting should be close to 55% to 65% of the same speed.

Figure 4:
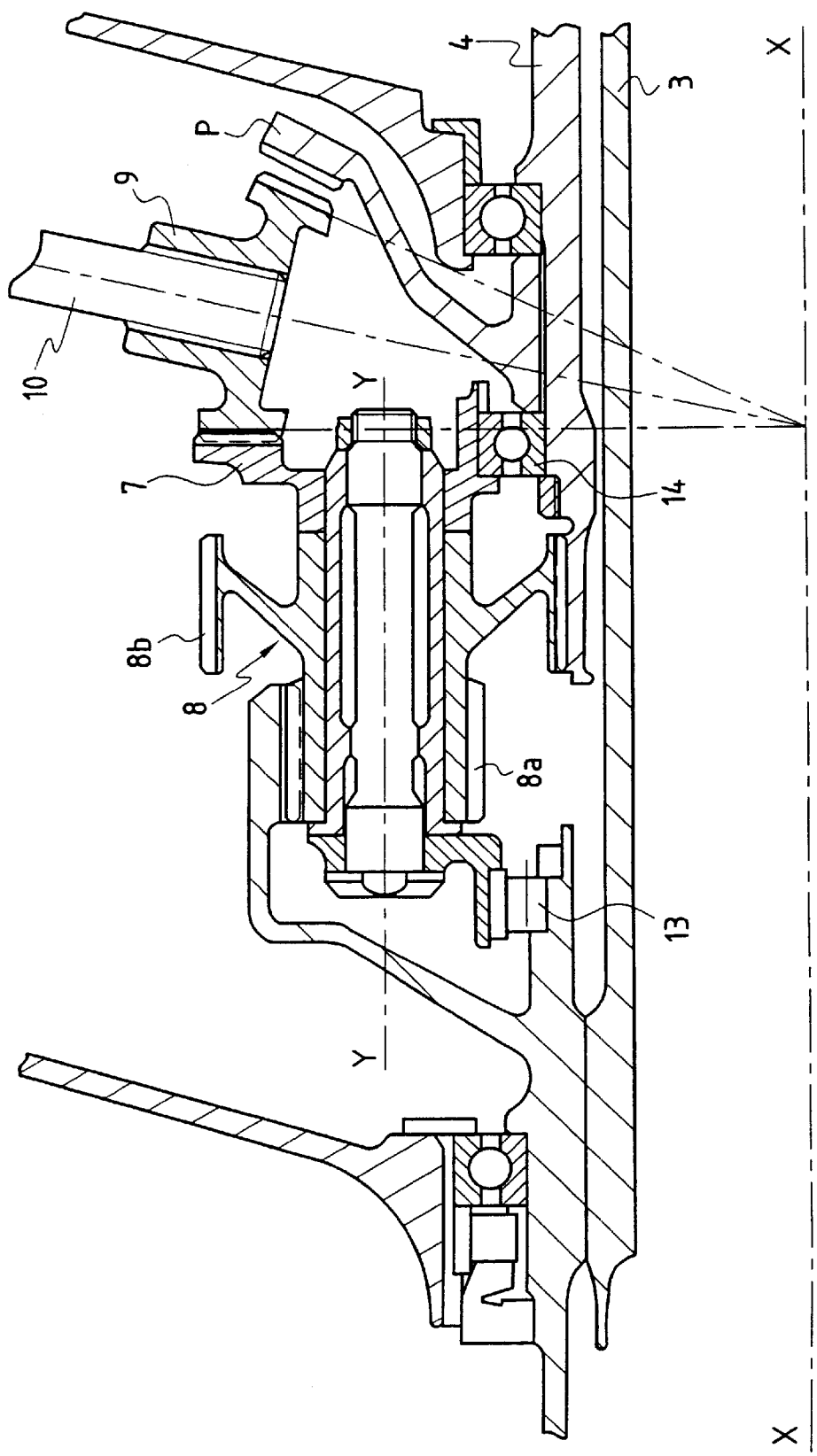
FIG. 4 is a diagrammatic view of the FIG. 1 differential in a contra-rotating shaft configuration.

According to an advantageous characteristic of the invention, the emergency relighting device can be used equally well in a configuration in which the first and second shafts are co-rotating shafts (cf. FIGS. 2 and 3) or in a configuration in which the first and second shafts are contra-rotating shafts (cf. FIG. 4).

As can easily be understood from FIG. 4, the shafts 3 and 4 rotate in opposite directions to each other. Nevertheless, the planet-carrying annular gear 7 and the planet gear 8 are identical to those of the emergency relighting device having co-rotating shafts, and they thus operate in similar manner.

Figure 5:
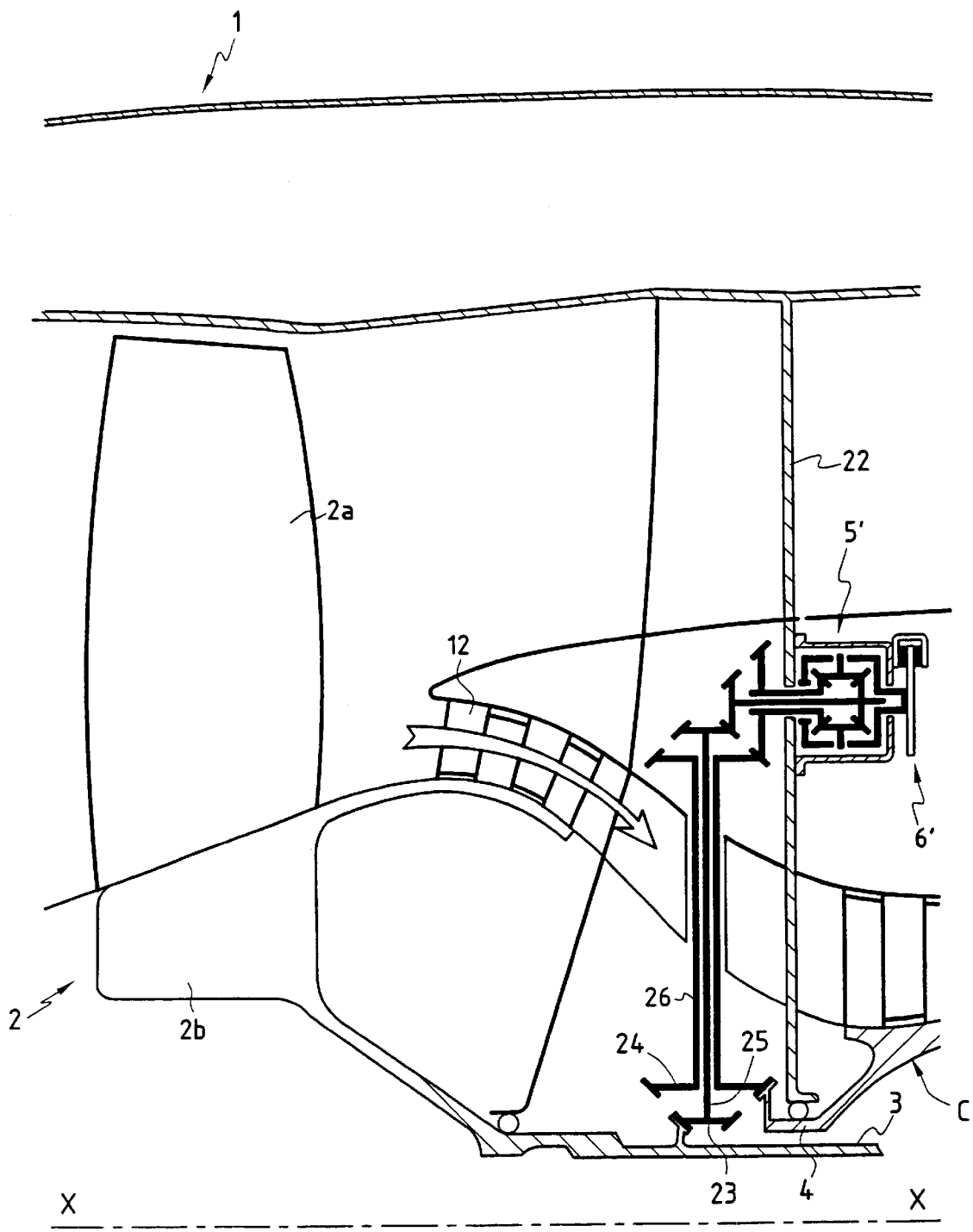
FIG. 5 is a fragmentary diagrammatic view of a turbojet including a second embodiment of a lighting device of the invention.

In a second embodiment of the invention show in FIG. 5, the differential 5' of the emergency relighting device is placed at a braking system 61 outside an intermediate casing 22. The advantage of this configuration is that it facilitates maintenance of the emergency relighting device (e.g. changing the differential), since it is thus made easily accessible.

In the example shown in FIG. 5, it can be seen that the emergency relighting device is made up in particular of two bevel gears 23, 24, which mesh respectively with the first and second shafts 3 and 4 and which are connected to the differential 5' via two respective drive shafts 25 and 26 that are concentric. The differential 5' is a conventional configuration of gears and is therefore not described in detail. The two drive shafts are not necessarily concentric; they could be parallel.

It should also be observed that the braking system 6' is identical to that used in the first embodiment, i.e. it is advantageously constituted by a disk brake.

Naturally, the operating principle of this embodiment of the emergency relighting device is identical to that described above, and it is therefore not described in detail.

According to an advantageous characteristic of the invention, an emergency relighting device also comprises a full authority electronic computer (not shown) commonly referred to as Full Authority Digital Engine Control (FADEC) for controlling the braking system 6 or 6'. By means of a suitable program, the computer serves to determine and modulate the braking force needed to adapt the transfer of energy from the fan to the high-pressure body.

This characteristic presents the advantage of enabling the emergency relighting device to vary its behavior compared with conventional passive systems. In order to add or to modify a function (e.g. speed, altitude, pressure, airspeed, or fuel feed rate) implemented by the electronic computer, it suffices to modify its program.

In addition, by using such a computer, it is not necessary to wait for the windmilling speeds of the fan and of the high-pressure turbine to be fully established before beginning and relighting stage. The emergency relighting device can be triggered by the computer during a stage in which speeds are decelerating so as to keep the high-pressure stage above the critical speeds and so as to initiate relighting, given that engines having a large bypass ratio do not retain the ability to be relighted while windmilling under all flight conditions (this depends on the minimum total pressure at the outlet from the high-pressure compressor, which in turn depends on altitude, on pressure, on the N2 speed, and on the airspeed). In particular, attempts at relighting the engine when the airplane is at low speed and at low altitude can fail, since the stable windmilling speed is then too low. It is therefore very important to avoid putting off an attempt at relighting after multiple shutdown, in order to benefit from a speed of rotation that is faster than the stabilized windmilling speed, i.e. while the engine is still decelerating.

As described above, the present invention presents numerous advantages, and in particular it makes it possible:

- to take advantage of a high-speed relative wind prior to the aircraft slowing down due to loss of thrust;
- to avoid slowing down to a speed that is too slow (which would give rise to a large loss of altitude or of lift) before relighting. If the high pressure N2 speed is insufficient to ensure starting while windmilling, the airplane then needs to lose altitude and/or to gain speed in order to take the engine into the appropriate windmilling zone, given that in-flight starting is easier at low altitude and at high airspeed;
- to make the high-pressure body independent in terms of relighting, and to drive its accessories (fuel pumps, oil pumps, etc.);
- to control or to avoid pumping of the high-pressure compressor by modulating the amount of power transmitted by the fan and possibly also the variable geometry of the compressor (variable timing and discharge valve), as a function of flying conditions, airspeed, and rotary speeds; and
- to improve the flexibility of the device, which can be developed merely by modifying the program of the electronic computer and which can be optimized point by point during testing. Because of the computer, it is possible to adapt the relighting device to different types of turbojet merely by changing the program of the computer.

The emergency relighting device of the invention also enables safety to be increased by:

- improving the range over which in-flight relighting is possible at low Mach numbers and at low altitudes, which is helpful given the stiffening of certification criteria;
- making it possible to test the device. It is easy to include a test for proper operation in the automatic maintenance tasks performed after each flight by the electronic computer on the ground. For example by activating the method during dry motoring, it is possible, by varying rotor speeds, to detect that the emergency relighting device is operating properly; and
- enabling the device and its method of operation to be implemented quickly. There is no need to wait until the fan and the high-pressure compressor have stabilized on windmilling speeds before triggering a relighting stage. This speed of implementation also makes it possible to take advantage of an engine that is still hot, since little air has passed through it, at a temperature that improves fuel spraying.

Finally, the combustion chamber and the fuel injectors can be optimized and dimensioned for a point that is less critical in terms of in-flight relighting. It is conventional for the combustion chamber to be dimensioned so as to provide a good compromise between relighting, specific fuel consumption, and pollution. The device of the present invention makes it possible to avoid that drawback. Furthermore, if the emergency relighting device is taken into account from initial design of the turbojet, then additional benefits are obtained, including a saving in turbojet mass obtained by reducing the length of the combustion chamber and a possible saving on the temperature profile at the outlet from the chamber. This leads to potential gains in lifetime by reducing the local maximum temperatures, and to potential gains on the efficiency of the high-pressure turbine, and thus on specific fuel consumption. The compromise between relighting requirements and limits on polluting emissions (NOx) is relaxed.

Naturally, the present invention is not limited to the embodiments described above, but covers any variants thereof.

What is claimed is:

1. An emergency device for relighting a windmilling turbojet, the jet comprising a fan driven by a low-pressure turbine via a first shaft and a compressor driven by a high-pressure turbine via a second shaft disposed coaxially around the first shaft, said device comprising a differential interconnecting said first and second shafts while compensating for their different speeds of rotation in normal operation of the turbojet, and a braking system connected to the differential so as to enable it to be slowed down or blocked when the turbojet shuts down, thereby enabling the first shaft to drive the second shaft so that it reaches a speed that favors relighting of the turbojet.

2. A device according to claim 1, wherein the differential comprises at least one planet-carrying annular gear rotating about the first and second shafts and coupled in rotation with a rotary portion of the braking system.

3. A device according to claim 1, wherein the differential acts as a multiplier from the first shaft to the second shaft when it is slowed down or blocked by the braking system.

4. A device according to claim 1, wherein the first and second shafts are co-rotating shafts.

5. A device according to claim 1, wherein the first and second shafts are contra-rotating shafts.

6. A device according to claim 1, wherein the braking system includes at least one disk brake.

7. A device according to claim 1, wherein the braking system includes a retarder.

8. A device according to claim 1, wherein the differential is placed together with the braking system outside an intermediate casing.

9. A device according to claim 1, further comprising an electronic computer enabling the braking system to be controlled and calculating the braking pressure that is required to adapt the transfer of energy from the first shaft to the second shaft.

* * * * *